United States Patent [19]

Lipsztajn et al.

[11] Patent Number: 5,174,868
[45] Date of Patent: Dec. 29, 1992

[54] CHLORINE DIOXIDE GENERATION FROM CHLORIC ACID

[75] Inventors: Marek Lipsztajn, Rexdale; Maurice C. J. Fredette; Zbigniew Twardowski, both of Mississauga, all of Canada

[73] Assignee: Tenneco Canada Inc., Islington, Canada

[21] Appl. No.: 570,791

[22] Filed: Aug. 22, 1990

[51] Int. Cl.⁵ .............. C25B 1/26; C01B 11/02; C01B 11/12; C01B 11/14
[52] U.S. Cl. .................. 204/95; 204/101; 423/472; 423/478
[58] Field of Search ........... 204/101, 92, 95, 98; 423/472, 478

[56] References Cited

U.S. PATENT DOCUMENTS

| | | | |
|---|---|---|---|
| 2,811,420 | 10/1957 | Pernart et al. | 423/480 |
| 3,810,969 | 5/1974 | Schlumberger | 423/472 |
| 3,864,456 | 2/1975 | Winfield et al. | 423/478 |
| 4,024,043 | 5/1977 | Dege et al. | 204/296 |
| 4,057,481 | 11/1977 | Lee et al. | 204/296 |
| 4,081,520 | 3/1978 | Swindells et al. | 423/478 |
| 4,086,328 | 4/1978 | Swindells | 423/478 |
| 4,116,889 | 9/1978 | Chlanda et al. | 521/27 |
| 4,180,815 | 12/1979 | Hill | 343/6.5 R |
| 4,253,900 | 3/1981 | Dege et al. | 156/309.3 |
| 4,355,116 | 10/1982 | Lee et al. | 521/27 |
| 4,426,263 | 1/1984 | Hardee et al. | 204/101 |
| 4,465,658 | 8/1984 | Fredette | 423/478 |
| 4,473,540 | 9/1984 | Fredette | 423/479 |
| 4,584,246 | 4/1986 | Liu et al. | 428/522 |
| 4,627,969 | 12/1986 | Fredette et al. | 423/478 |
| 4,673,454 | 6/1987 | Liu et al. | 156/281 |
| 4,767,510 | 8/1988 | Lipsztajn | 204/101 |
| 4,798,715 | 1/1989 | Hardee et al. | 423/478 |
| 4,806,215 | 2/1989 | Twardowski | 204/101 |
| 4,915,927 | 4/1990 | Lipsztajn et al. | 423/472 |
| 4,938,943 | 7/1990 | Norell | 423/478 |
| 4,961,918 | 8/1990 | Norell et al. | 423/478 |
| 5,084,148 | 1/1992 | Kazcur et al. | 204/101 |
| 5,089,095 | 2/1992 | Cawlfield et al. | 204/101 |

FOREIGN PATENT DOCUMENTS

| | | | |
|---|---|---|---|
| 4326370 | 2/1966 | Japan | 204/101 |
| WO91/12356 | 8/1991 | World Int. Prop. O. | |

Primary Examiner—John Niebling
Assistant Examiner—Brian M. Bolam
Attorney, Agent, or Firm—Sim & McBurney

[57] ABSTRACT

Chlorine dioxide, useful as a pulp mill chemical, is produced without producing sodium sulfate effluent for disposal, by effecting reduction of chloric acid in an aqueous reaction medium in a reaction zone at a total acid normality of up to about 7 normal in the substantial absence of sulfate ion and in the presence of a dead load of sodium chlorate added to and subsequently removed from the reaction medium. Chloric acid for the process is produced electrolytically from an aqueous solution of the deadload sodium chlorate and make-up quantities of sodium chlorate. The chloric acid reduction to produce chlorine dioxide may be effected using methanol or electrolytically.

46 Claims, 2 Drawing Sheets

FIG. 1

CHLORINE DIOXIDE GENERATION FROM CHLORIC ACID

FIELD OF INVENTION

The present invention relates to the production of chlorine dioxide from mixtures of chloric acid and alkali metal chlorates, usually sodium chlorate.

BACKGROUND TO THE INVENTION

Chlorine dioxide, useful as a pulp mill bleaching agent, is produced chemically by reduction of an acid aqueous chlorate solution in accordance with the equation:

$$ClO_3^- + 2H^+ + e^- \rightarrow ClO_2 + H_2O$$

where the electron $e^-$ is supplied by various reducing agents, for example, methanol, chloride ion and hydrogen peroxide. In many commercial processes for effecting this reaction, the acidity for the process is provided by sulfuric acid while the chlorate ions are provided by sodium chlorate. The presence of these species leads to the formation of some form of sodium sulfate as a by-product.

One particular embodiment of a commercial process is the so-called "R8" process of the assignee of this application, as described in U.S. Pat. No. 4,081,520, assigned to the assignee herein and the disclosure of which is incorporated herein by reference. Improvements in and modifications to that process also are described in the assignee's U.S. Pat. Nos. 4,465,658, 4,473,540 and 4,627,969, the disclosures of which are incorporated herein by reference.

In that chlorine dioxide generating process, the reaction medium is at a high total acid normality of sulfuric acid and is maintained at its boiling point under a subatmospheric pressure applied thereto. Methanol is used as a reducing agent for chlorate ions, resulting in the formation of chlorine dioxide in a substantially pure form. The boiling nature of the reaction medium produces steam which acts as a diluent for the gaseous chlorine dioxide, so as to prevent decomposition of the chlorine dioxide.

The sodium sulfate by-product builds up in the reaction medium after start-up until the solution is saturated with sodium sulfate, whereupon the sodium sulfate precipitates from the reaction medium. A slurry of the sodium sulfate is removed from the reaction vessel, the crystalline sodium sulfate is filtered therefrom and the mother liquor is recycled to the reaction zone after the addition of make-up quantities of sodium chlorate, sulfuric acid and methanol.

This process is highly efficient and rapidly produces chlorine dioxide in commercial quantities. As may be concluded from the above equation, for each mole of chlorine dioxide produced, a mole of chlorate ion and hence of sodium ion is introduced to the reaction medium. The sodium ions combine with the sulfate ions introduced with the sulfuric acid, to produce a sodium sulfate, which may be sodium bisulfate or, more normally under the conditions of an R8 process, the double salt sodium sesquisulfate, i.e., $Na_3H(SO_4)_2$ (or $NaHSO_4 \cdot Na_2SO_4$), depending on the acidity of the solution.

Another sulfuric acid-based chlorine dioxide generating process, a low acidity "R3" process, as described in U.S. Pat. No. 3,864,456, the disclosure of which is incorporated herein by reference, produces neutral sodium sulfate as the by-product.

Such by-product sodium sulfate and sodium sesquisulfate (sometimes termed "saltcake"), generally have been employed to make up sulfur losses in the pulp mill.

However, the adoption of high substitution of chlorine by chlorine dioxide in the chlorination stage of the bleach plant has led to saltcake by-product production from the chlorine dioxide generating process exceeding the mill make-up requirements.

There exists a need, therefore, for a chlorine dioxide generating process which possesses the attributes of, for example, the R8 process, while, at the same time, producing less sodium sulfate by-product for the same level of production of chlorine dioxide.

It has long been suggested, for example, in U.S. Pat. No. 2,811,420, to use chloric acid as a substitute for a metal chlorate to produce chlorine dioxide, in view of the fact that the metal cation does not need compensating for, so that a reaction of chloric acid and hydrochloric acid would produce chlorine dioxide, chlorine, water and no other by-product, in accordance with the equation:

$$HClO_3 + HCl \rightarrow ClO_2 + \tfrac{1}{2}Cl_2 + H_2O$$

However, despite the evident advantage of a procedure producing no saltcake by-product, there has previously been no commercially-feasible process for producing chloric acid, and hence such a chlorine dioxide generating procedure has not been practiced.

In our copending U.S. patent application Ser. No. 535,165 filed Jun. 8, 1990 [E437], assigned to the assignee hereof and the disclosure of which is incorporated herein by reference, we have described an electrochemical process for the production of mixtures of sodium chlorate or other alkali metal chlorate and chloric acid from an aqueous solution of alkali metal chlorate.

SUMMARY OF INVENTION

It now has surprisingly been found that such mixtures of alkali metal chlorate and chloric acid may be used to form chlorine dioxide in the absence of sulfate ions and hence there is avoided the production of by-product saltcake which must be disposed of or further processed.

Accordingly, in one aspect of the present invention, there is provided a method for the production of chlorine dioxide, which comprises effecting reduction of chloric acid to form chlorine dioxide in an aqueous reaction medium in a reaction zone at a total acid normality up to about 7 normal in the substantial absence of sulfate ion and in the presence of a dead load of alkali metal chlorate added to and subsequently removed from the reaction medium.

Preferably, the process is a continuous one whereby the dead load alkali metal chlorate cycles between the reaction zone and an electrolysis zone in which an alkali metal chlorate feed solution, which includes the dead load alkali metal chlorate and added alkali metal chlorate to make up for chloric acid consumed in the process, is electrochemically acidified while alkali metal ions are electrochemically removed from the feed solution. The acidified solution, containing chloric acid and the dead load alkali metal chlorate, then is forwarded to the reaction zone to provide the chloric acid feed thereto. The alkali metal chlorate preferably is sodium chlorate.

One manner of effecting the electrochemical acidification and electrochemical removal of alkali metal ions employs an electrolytic cell comprising a cation-exchange membrane dividing the cell into anode compartment and a cathode compartment.

The aqueous feed solution is fed to the anode compartment and hydrogen ions are electrolytically produced in the anode compartment while alkali metal ions are transferred from the anode compartment through the cation-exchange membrane to the cathode compartment. The acidified alkali metal chlorate solution containing chloric acid is removed from the anode compartment.

Alternatively, any other oxidation reaction producing hydrogen ions, for example, hydrogen gas oxidation to hydrogen ions, may be employed as an anodic reaction. Such anodic hydrogen gas oxidation may be combined with oxygen gas electroreduction as a cathodic reaction, to provide a fuel cell operation wherein, in addition to acidification of anolyte and production of alkali metal hydroxide solution in the catholyte, electrical energy is generated.

When an anodic oxidation of hydrogen gas to hydrogen ions is combined with a cathodic reduction of water to hydroxyl ions and hydrogen gas, the latter gas may be used as an anodic feed and, at the same time, a substantial energy savings may be achieved, as a result of the difference in electrochemical reaction potentials. Similarly, an analogous energy and material savings is achieved when an anodic oxidation of water to hydrogen ions and oxygen is combined with cathodic reduction of the oxygen gas stream.

The migration of alkali metal cations and the electrochemical reaction producing hydroxyl ions have the effect of producing an alkali metal hydroxide solution in the cathode compartment, which may be recovered as a useful by-product.

In order to achieve high current efficiencies of at least about 70%, preferably at least about 80%, and thereby provide an economic process, the molar ratio of $[Na^+]:[H^-]$ in the anolyte generally varies from about 1000:1 to about 1:5, preferably about 1000:1 to about 1:2, throughout the electrolytic reaction.

The chloric acid generally comprises the sole acid species in the chlorine dioxide-generating reaction medium. It may be desirable in certain cases to blend the chloric acid with one or more additional acids to provide the desired total acid normality level up to a maximum of about 7 normal, as noted above.

In addition, the reaction medium may contain one or more buffering ions, which result in a total acid normality greater than the free hydrogen ion concentration of the reaction medium. This effect is described in U.S. Pat. No. 4,086,328 [E132], assigned to the assignee hereof and the disclosure of which is incorporated herein by reference.

In one embodiment of the invention, the reduction of chloric acid in the aqueous reaction medium to produce chlorine dioxide may be effected using methanol. This procedure enables an effluent-free form of the R8 process to be provided. Accordingly, in another aspect of the present invention, there is provided a method for the production of chlorine dioxide, which comprises feeding chloric acid and an aqueous solution of an alkali metal chlorate to an aqueous acid reaction medium in a reaction zone having a total acid normality up to about 7 normal, maintaining the aqueous reaction medium at its boiling point under a subatmospheric pressure applied to the reaction zone, generating chlorine dioxide from the aqueous acid reaction medium at the total acid normality of up to about 7 normal maintained by the fed chloric acid, removing chlorine dioxide in admixture with steam from the reaction zone, and recovering the fed alkali metal chlorate from the reaction zone.

In another embodiment of the invention, the reduction of chloric acid in the aqueous reaction medium to form chlorine dioxide may be effected in an electrolytic operation. There is described in U.S. Pat. No. 4,767,510 [E197], assigned to the assignee herein and the disclosure of which is incorporated herein by reference, an electrochemical process for the production of chlorine dioxide which is carried out by passing a cathodic electrical current through an aqueous acid solution of chlorate ions having a total acid normality greater than that of about 7 normal sulphuric acid and a sodium chlorate concentration preferably of about 0.1 to about 2 molar. This electrochemical procedure is used in this embodiment of the invention, albeit in a modified form. The prior patent indicates that it was not possible to produce relatively pure chlorine dioxide at a total acid normality below 7 normal. It has now been found that this is possible by employing chloric acid.

Accordingly, in a further aspect of the invention, there is provided an electrochemical process for the production of chlorine dioxide, which comprises passing a cathodic electrical current through an aqueous acid solution of chloric acid having a total acid normality less than about 7 normal.

DESCRIPTION OF PREFERRED EMBODIMENT

Figure 1:
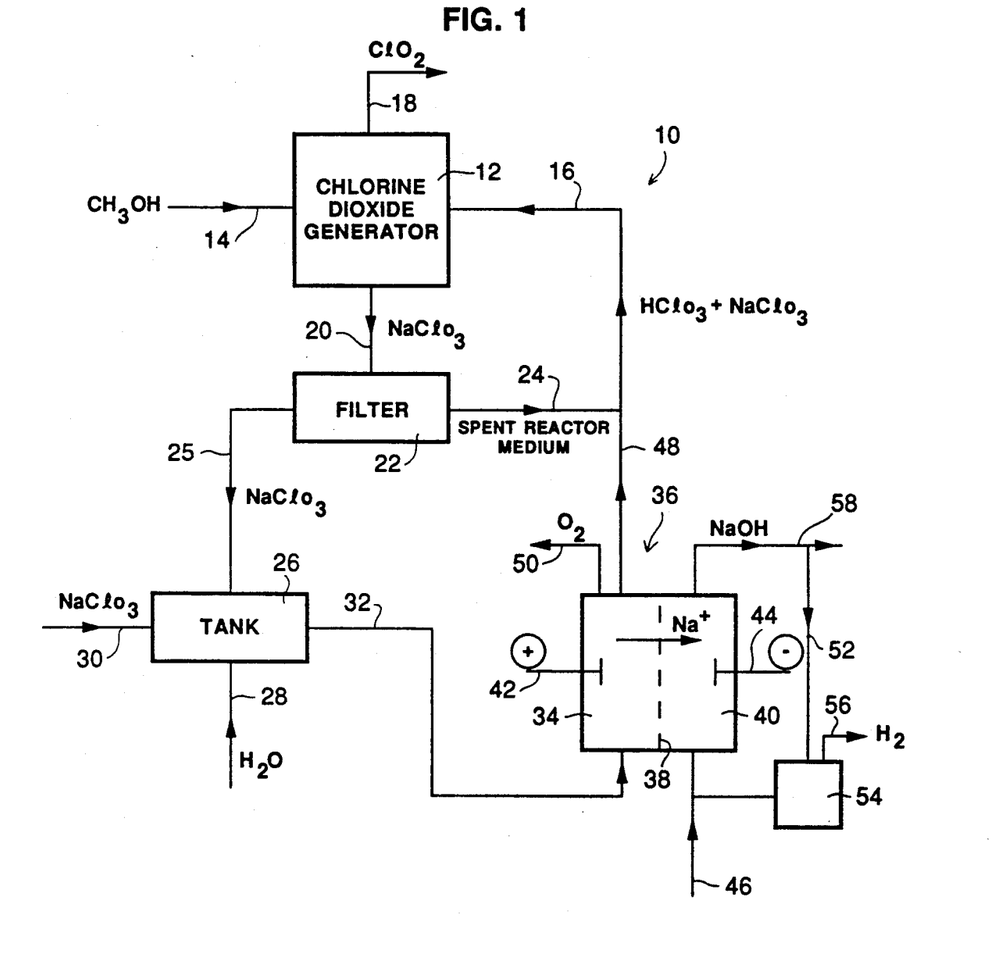
FIG. 1 is a schematic flow sheet of a chlorine dioxide generating process provided in accordance with one embodiment of the invention.

Referring to FIG. 1, FIG. 1 depicts an embodiment of the production of chlorine dioxide in accordance with the invention. A chlorine dioxide generating procedure 10 comprises a chlorine dioxide generator 12 wherein chloric acid is reduced with methanol to form chlorine dioxide in an aqueous acid reaction medium which is maintained at its boiling point under a subatmospheric pressure applied thereto.

The acidity of the reaction medium may vary from up to about 7 normal, generally from about 0.1 to about 6 normal, preferably from about 1 to about 3 normal and most preferably, from about 1.5 to about 2.5 normal.

The concentration of sodium chlorate in the reaction medium ranges up to saturation of the reaction medium by sodium chlorate, generally 6 to about 9 molar, preferably about 7 to about 8 molar. The chlorine dioxide generator 12 may operate under condition of saturation of the reaction medium by sodium chlorate, in which case, precipitation of sodium chlorate from the reaction medium in the chlorine dioxide generator 12 occurs. Alternatively, the generator 12 may be operated at less than saturation.

The temperature of the reaction medium in the chlorine dioxide generator generally is at least about 50° C. up to the temperature of spontaneous decomposition of chlorine dioxide, preferably about 60° to about 75° C. The subatmospheric pressure applied to the chlorine dioxide generator 12 to maintain the reaction medium at its boiling point at the reaction temperature generally varies from about 50 to about 400 mm Hg, preferably about 90 to about 150 mm Hg. An air bleed may be used, if desired, to control the partial pressure of chlorine dioxide in the product gas stream.

A feed of methanol is provided to the chlorine dioxide generator 12 by line 14 while an aqueous solution of chloric acid and sodium chlorate, along with recycled spent reaction medium, is fed to the chlorine dioxide generator 12 by line 16. Chlorine dioxide generated in the generator 12 from the aqueous acid reaction medium is vented from the chlorine dioxide generator 12 by line 18 in admixture with steam and is processed to form an aqueous solution of chlorine dioxide for subsequent use, such as in pulp mill bleaching.

Sodium chlorate precipitated in the generator 12 is removed as a slurry in spent reaction medium by line 20 to a filter 22, wherein the crystalline sodium chlorate is separated from spent reaction medium. In the case where the chlorine dioxide generator 12 is operated in a non-crystallizing mode, the filter 22 is omitted. The sodium chlorate which is removed by line 20 is the same quantity as fed by line 16, under steady-state, continuous-operation conditions, and hence simply exists as a dead load passing through the chlorine dioxide generator 12. As will be seen from the succeeding description, this sodium chlorate cycles around the whole circuit within a closed loop, so that there is no effluent formed which requires treatment, in contrast to the prior-described commercial processes. In addition, since the chlorine dioxide-generating process employs no sulphuric acid, sulfate ions are absent from the chlorine dioxide-generating reaction medium, and hence no sodium sulfate can be formed which requires further processing or use.

The spent reaction medium resulting from separation from crystalline sodium chlorate in the filter 22 is forwarded by line 24 to the feed line 16, so as to be recycled to the chlorine dioxide generator 12 with the aqueous solution of chloric acid and sodium chlorate.

The crystalline sodium chlorate from the filter 22 is forwarded by line 25 to a dissolving tank 26 wherein the sodium chlorate is dissolved in water fed by line 28, to form an aqueous solution thereof. Additional sodium chlorate in line 30 also may be fed to the dissolving tank 26 to make up for chlorate consumed in the chlorine dioxide generating process in the chlorine dioxide generator 12. Alternatively, the make-up sodium chlorate may be added to the sodium chlorate solution resulting from the dissolving tank 26.

The aqueous sodium chlorate solution resulting from the dissolving tank 26 preferably is substantially saturated with respect to sodium chlorate, and may contain suspended sodium chlorate crystals, for reasons discussed below. The solution in line 32 is forwarded to the anode compartment 34 of a membrane-divided electrolysis cell 36. When a slurry of sodium chlorate is employed, it is generally desirable to isolate the anode from the slurry in the cell 36, such as by employing an additional separator or separators, such as an ion-exchange membrane or a diaphragm, between the feed stream in line 32 and the anode. Such additional separator also may be employed, if desired, if the feed does not comprise a slurry.

The cell 36 comprises a cation-exchange membrane 38, which divides the interior of the cell 36 into the anode compartment 34 and a cathode compartment 40, in which are located cell anode 42 and cell cathode 44, respectively.

The cation-exchange membrane 38 may be formed of any convenient material which enables cations to selectively pass therethrough in preference to anions. Preferably, the cation-exchange membrane is formed of perfluorocarbon polymer having pendant cation-exchange functional groups, such as those sold under the trademarks "NAFION" (DuPont) or "FLEMION" (Asahi Glass).

In the event an additional ion exchange membrane or membranes is used in the anode compartment, such membrane may be formed of any convenient ion-exchange material.

The anode 42 employed in the electrolytic cell may take any desired form, but it is preferred to employ a low overpotential one with respect to the oxygen evolution reaction, for example, a DSA-O₂ ® electrode. Similarly, any convenient material of construction may be used for the cathode 44, for example, nickel.

An aqueous electrolyte of any convenient type is fed by line 46 to the cathode compartment 40. A current is applied between the anode 42 and the cathode 44, so as to effect electrolysis of the aqueous solution of sodium chlorate in the anode compartment 34 and electrolyte in the cathode compartment 40.

In the cell 36, several reactions occur simultaneously as a result of the application of the electrical current. At the anode 42, water is electrolyzed to oxygen and hydrogen ion, as follows:

$$H_2O \rightarrow \tfrac{1}{2}O_2 + 2H^+ + 2e^-$$

while at the cathode 42, water is electrolyzed to hydrogen and hydroxyl ion, as follows:

$$e^- + H_2O \rightarrow \tfrac{1}{2}H_2 + OH^-$$

At the same time, sodium ions in the aqueous solution or slurry of sodium chlorate migrate under the influence of the applied current from the anode compartment 34 across the cation-exchange membrane 38 to the cathode compartment 40. In effect, therefore, the electrolytically-produced hydrogen ions replace the transferred sodium ions in the anode compartment 34 and the transferred sodium ions are available to combine with the electrolytically-produced hydroxyl ions in the cathode compartment 40.

The overall reaction in cell 36 can be considered to be represented, as follows:

$$xNaClO_3 + 3H_2O \rightarrow (x-2)NaClO_3 + 2HClO_3 + 2NaOH + \tfrac{1}{2}O_2 + H_2$$

where x is the total molar amount of sodium chlorate processed and (x−2) NaClO₃ is the molar amount of sodium chlorate cycling as a deadload. The resulting chloric acid-containing aqueous sodium chlorate solution then is forwarded by line 48 to the feed line 16 to the chlorine dioxide generator 12.

Oxygen is vented from the anode compartment 34 by line 50. Alternatively, the acidified product stream may be recycled to the anode compartment to build up the desired acid normality in the acidified solution in line 48, with oxygen being vented from a suitable gas-liquid separator.

The sodium hydroxide produced in the cathode compartment 40 is recycled by line 52, through a gas-liquid separator 54 from which hydrogen is vented by line 56, until the desired concentration of sodium hydroxide solution is achieved. Alternatively, a single pass of electrolyte through the cathode compartment may be employed. The resulting aqueous sodium hydroxide solution is recovered as an aqueous product stream in line 58. This solution has considerable utility in a pulp mill, particularly as a chemical used in the purifying and bleaching operations effected in the bleach plant of the pulp mill. The gaseous by-products, namely hydrogen and oxygen, also may be utilized in the pulp mill.

When pulp mills have an on-site electrolytic process for producing aqueous sodium hydroxide, usually from sodium chloride, such process results in the co-production of chlorine. The ability to utilize such co-produced chlorine, however, is often limited, which leads to a caustic/chlorine imbalance in the pulp mill. By utilizing the process of invention, not only is the problem of co-production of excess sodium sulfate in the chlorine dioxide generation process overcome, but also the problem of co-production of chlorine in sodium hydroxide production is overcome. The concentration of sodium hydroxide solution produced in the cathode compartment 40 may be adjusted to any reasonable level, by adjusting flow rates and recycling product solution, as described above.

High current efficiency for the electrolytic process effected in the cell 36 as described above can be attributed to the high $[Na^+]:[H^+]$ molar ratio in the anode compartment 34. Such high $[Na^+]:[H^+]$ ratio is achieved by employing a deadload of sodium ions, in the form of sodium chlorate, cycling between the cell 36 and the chlorine dioxide generator 12.

Generally, the molar ratio of $[Na^+]:[H^+]$ in the anode compartment 34 varies from about 1000:1 to about 1:5, preferably about 1000:1 to about 1:2. Such a ratio is dependent on the concentration of the feed solution to the anode compartment 34 and the extent to which sodium ions are transferred from the anode compartment 34 to the cathode compartment 40. Accordingly, it is preferred to employ a feed solution having a concentration of about 0.1 to about 15 M in sodium ions and to remove from the anode compartment 34 for feed to the chlorine dioxide generator 12 an acidified solution having a concentration of about 0.1 to about 12 M in sodium ions.

The electrolytic process effected in the cell 36 increases the total acid normality of the alkali metal chlorate solution in line 32. Depending on the initial total acid normality and the degree of electrolysis effected on the feed material in line 32, it may be desirable to concentrate, such as by evaporation, the product stream in line 48 to increase its total acid normality, prior to feed to the chlorine dioxide generator 12 in order to provide the desired total acid normality in the chlorine dioxide-generating reaction medium. Generally, the total acid normality of the feed solution varies from about neutral to about 12 normal, preferably about 0.1 to about 10 normal, and the electrolysis is effected to such a degree as to provide a product stream in line 48 from the anode compartment 34 having a total acid normality generally from about 0.2 to about 15 normal, preferably about 0.5 to about 6 normal.

The parameters of operation of the cell 36 are not critical to the process of the invention and may vary widely. For example, the electrolytic process may be effected under any desired electrolytic conditions, generally at a membrane current density of about 0.01 to about 10 kA/m², preferably about 1 to about 5 kA/m².

Similarly, the electrolytic process may be carried out over a wide range of temperatures, generally from about 0° to about 150° C., preferably from about 15° to about 90° C. Generally, higher temperatures are preferred, in view of the generally greater solubility of the alkali metal chlorate at high temperatures, thereby enhancing the $[Na^+]:[H^+]$ molar ratio. This greater solubility at high temperature is particularly true of sodium chlorate, so that higher temperature operation, above about 60° C., is preferred. The acidified product stream from the electrolysis retains a high concentration of sodium chlorate, so that cooling of that product stream prior to passage to the chlorine dioxide generator 12 may lead to precipitation of sodium chlorate, which can be removed and recycled to the cell feed.

As may be seen from the above description, the process of FIG. 1 produces chlorine dioxide from chloric acid and methanol and is able to do so at high efficiencies greater than about 90%, preferably greater than about 95%. The process does not require the disposal of any effluent, and, in particular, sodium sulfate is not co-produced. Sodium ions, introduced as sodium chlorate to provide chlorate ions for the chlorine dioxide-generating process, exit the process in form of aqueous sodium hydroxide solution. The acid for the chlorine dioxide generating process is produced electrolytically from water, which co-produces the hydroxyl ions required to combine with the sodium ions.

The electrolysis process of acidification of the sodium chlorate solution also may be carried out by electrodialysis using bipolar membranes. In this embodiment, the aqueous sodium chlorate feed is processed in a plurality of unit cells, with each unit cell being separated from the adjacent ones by bipolar membranes. The bipolar membranes have an anionic face in the base compartment of one cell and a cationic face in the acid compartment of an adjacent cell. The individual cells may be divided by a single cation exchange membrane, or by two such membranes.

In the latter procedure, the sodium chlorate for acidification is fed to a central compartment between the two cation-exchange membranes, the acidified effluent from that central compartment passing to the acid compartment for further acidification. Sodium ions from the acid compartment pass to the central compartment, while sodium ions pass from the central compartment to the base compartment.

With the plurality of cells separated by bipolar membranes, gas evolution does not take place in the acid and base compartments, and the overall reaction may be represented by the equation:

The plurality of cells is terminated at both ends by cationic membranes. A separate electrode rinse solution, such as a sodium sulfate solution, is circulated between the cathodic and anodic compartments adjacent to the cathode and anode respectively. A single electrical current feed, therefore, is used to effect acidification in parallel in a plurality of unit cells, with gaseous evolution occurring only in the end anode and cathode compartments.

Bipolar membranes and their operation are well known and are described, for example, in U.S. Pat. Nos. 4,024,043, 4,180,815, 4,057,481, 4,355,116, 4,116,889, 4,253,900, 4,584,246 and 4,673,454 and reference may be had to such patents for details thereof.

Figure 2:
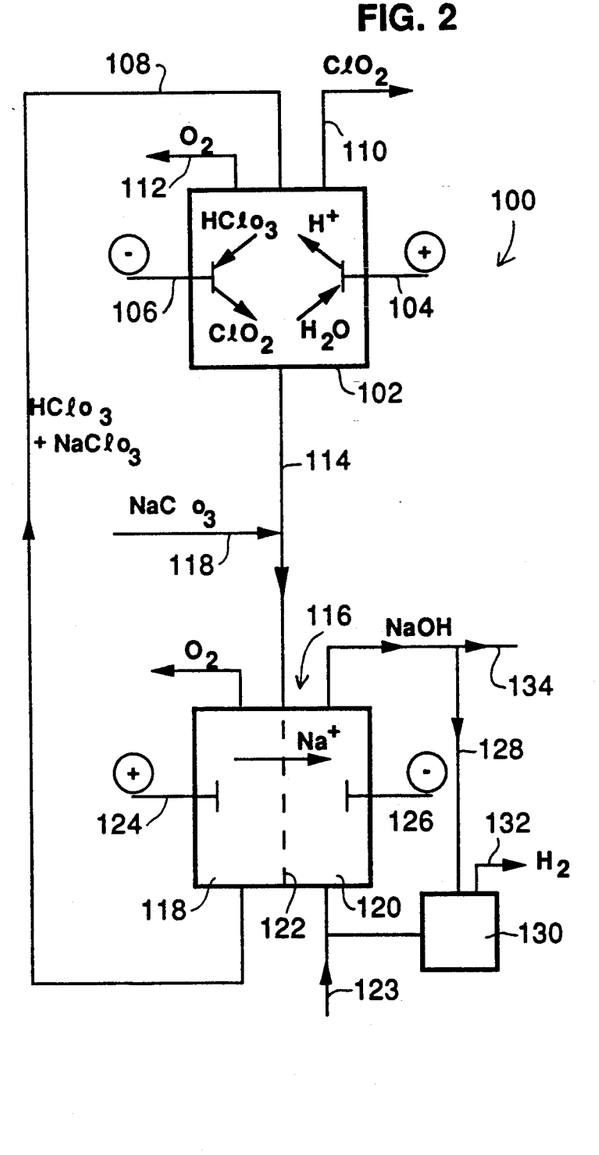
FIG. 2 is a schematic flow sheet of a chlorine dioxide generating process provided in accordance with another embodiment of this invention.

Turning now to FIG. 2, there is shown therein an embodiment of the invention, wherein chlorine dioxide is produced autocatalytically in an electrolytic process. As mentioned above, such a procedure using sulfuric acid at a total acid normality greater than that of about 7 and a sodium chlorate concentration of preferably about 0.1 to about 2 molar has been described in U.S. Pat. No. 4,767,510.

A chlorine dioxide generating procedure 100 comprises a chlorine dioxide generator 102, wherein chloric acid is reduced electrochemically in an aqueous acid reaction medium to form chlorine dioxide.

The chlorine dioxide generator 102 comprises an undivided electrolytic cell having an anode 104 and a cathode 106, although the cell may be divided into separate anode and cathode compartments by any suitable cation-exchange membrane, if desired.

Chlorine dioxide is produced in the cell 102 from a feed solution of chloric acid and sodium chlorate fed by line 108 and the product chlorine dioxide is removed by line 110. The mechanism of generation of chlorine dioxide by the electrochemical process in the cell 102 is believed to involve chemical reaction between chlorate ions and electrolytically-produced short-lived chlorite ions to form chlorine dioxide. Part of the chemically-produced chlorine dioxide is electrochemically reduced to form chlorite ions, while the remainder of the chlorine dioxide is removed from the solution as product.

The reactions which are thought to occur may be depicted as follows:

Overall: $ClO_3^- + e^- + 2H^+ \rightarrow ClO_2 + H_2O$ From these equations, it will be seen that the process can be considered autocatalytic, in that generated chlorine dioxide is used to produce the active species for reduction of chlorate ions. A residual concentration of chlorine dioxide must be maintained in the aqueous acid solution to maintain the autocatalytic cycle, as described in U.S. Pat. No. 4,767,510.

In an undivided cell, the chlorite ions will attempt to migrate to the anode 104 but are consumed by the chlorate ions present in large excess in the electrolyte to form the chlorine dioxide, so that the chlorite ions never reach the anode and, in addition, their lifetime in the acidic medium is very short.

If the cell as a whole is considered, then the anodic and cathodic reactions may be depicted as follows:
Cathode: $2HClO_3 + 2e^- + 2H^+ \rightarrow 2ClO_2 + 2H_2O$
Anode: $H_2O - 2e^- \rightarrow \frac{1}{2}O_2 + 2H^+$
These reactions are depicted in FIG. 2. Overall
Cell: $2HClO_3 \rightarrow 2ClO_2 + \frac{1}{2}O_2 + H_2O$
This electrochemical procedure for producing chlorine dioxide produces the same molar amount of chlorine dioxide as a chemical process for effecting such production while half the amount of water is produced and half the amount of acid is consumed.

As in the case of the embodiment of FIG. 1, the chlorine dioxide product gas stream in line 110 is substantially pure and uncontaminated with chlorine. The by-product oxygen from the anodic reaction may be vented by line 112.

No chlorine dioxide is produced from the feed solution in line 108 in the absence of an applied electric current.

The cathode 106 which is used in the process of the invention may be constructed any convenient electroconductive material which is chemically inert (i.e. has no catalytic properties) to the chemical production of chlorine dioxide by reduction of chlorate ions in the acid aqueous reaction medium, in contrast to the materials described in U.S. Pat. No. 4,426,263 referred to in the aforementioned U.S. Pat. No. 4,767,510. Suitable cathode materials include the platinum group metals and, preferably in view of its cheapness and ease of use, carbon in any form, for example, graphite and vitreous carbon. The use of a carbon cathode also is advantageous, since it stabilizes the intermediate state, that is, the chlorite ions, against further electroreduction to a lower valency state, such as $ClO^{3-}$ or $Cl^-$. The cathode may be in a three-dimensional high surface area form to improve current efficiency.

The anode 104 employed in the electrolytic cell may take any desired form, but it is preferred to employ a low overpotential one with respect to the oxygen evolution reaction, for example, a DSA-$O_2$ ® electrode. Similarly, any convenient material of construction may be used for the cathode 44, for example, nickel.

The electrochemical production of chlorine dioxide from chloric acid in the cell 102 is effected at a total acid normality below 7 normal and at a chlorate ion concentration generally above about 2 molar and ranging up to saturation of the reaction medium.

The relatively high chlorate ion concentration employed herein provides a driving force for the formation of chlorine dioxide from the chloric acid at a total acid normality below about 7 normal, as does the absence of sulfate ions. In this way, chlorine dioxide is produced using conditions under which it is indicated in U.S. Pat. No. 4,767,510 it is not possible to produce chlorine dioxide.

Sulfate ions tend to buffer hydrogen ions, while high chlorate ion concentrations result in an increased concentration of undissociated chloric acid, which is believed to be one of the key intermediates involved in the chlorine dioxide generating process.

The high chlorate ion concentration in the reaction medium is provided by the feed mixture of chloric acid and sodium chlorate in line 108. The sodium chlorate is present as a dead load but provides the desired reaction conditions in the aqueous acid reaction medium.

The total acid normality of the reaction medium generally varies from about 1.5 to about 7 normal, preferably about 1.5 to about 3.5 normal. The chlorate ion concentration in the reaction medium generally varies from about 2 molar to saturation, preferably about 5 to about 9 molar.

In order to sustain the reactions which are thought to be involved in the electrochemical process in the generator 102, it is essential to maintain a dissolved concentration of chlorine dioxide in the electrolyte. Chlorine dioxide generation ceases if all the produced chlorine dioxide is removed. In addition, some dissolved chlorine dioxide is necessary at start up. A concentration of dissolved chlorine dioxide in the range of about 0.01 to about 15 grams per liter (gpl) may be employed, preferably about 0.1 to about 8 gpl, at the initial start up and during the reaction.

In order to minimize side reactions and to maximize the overall chemical efficiency of the production of one mole of chlorine dioxide or each mole of chlorate ion consumed, the concentration of chlorate ion in the electrolyte should be in substantial excess to the concentration of dissolved chlorine dioxide, generally a molar excess of at least about 2:1, preferably at least about 10:1 usually up to about 1000:1.

Generally, the concentration of dissolved chlorine dioxide is maintained at a substantially uniform level by stripping chlorine dioxide at the rate of its formation. Chlorine dioxide spontaneously decomposes at high partial pressures thereof and it is necessary to dilute the chlorine dioxide well below the decomposition partial pressure, usually below about 100 mm Hg. Any convenient diluent gas, usually air, may be used to strip the generated chlorine dioxide from the electrolytic cell 102 and to provide the required dilution. Chlorine dioxide may be recovered from the off-gas stream in line 110 by dissolution in water.

The electrical potential applied to the cathode 106 during the electrochemical reaction depends on the material of construction of the electrode and usually varies from about $+1.0$ to about $-0.5$ Volts as compared with a saturated calomel electrode (SCE). For a carbon electrode, the preferred potential is approximately $+0.4$ Volts while for a platinum electrode, the preferred potential is approximately $+0.7$ Volts. The process usually is operated under constant voltage conditions while the current also preferably is constant.

The temperature of operation of the cell affects the purity of the chlorine dioxide gas which is obtained. Higher temperatures favour the formation of chloride ions by decomposition of chlorite ions in accordance with the equation:

$$5ClO_2^- + 4H^+ \rightarrow 4ClO_2 + Cl^- + 2H_2O$$

but such decomposition tends to be counteracted by the higher chlorate concentration. Formation of chloride ions in this way results in the formation of chlorine, with the consequent loss of efficiency greater than about 90%, preferably greater than about 95%, and chlorine dioxide purity.

An aqueous effluent stream comprising the deadload sodium chlorate is recovered from the cell 102 by line 114 and is forwarded to a further electrolytic cell 116. Make-up sodium chlorate to replenish the chlorate ions consumed via the chloric acid to form chlorine dioxide is fed by line 118. Preferably, the sodium chlorate fed by line 118 is in crystalline form to be dissolved in the water produced by the cell 102.

The cell 116 is constructed and operated in identical manner to cell 36 described above with respect to FIG. 1 and reference may be had to that description for details thereof. A bipolar membrane cell also may be used, as described above with respect to FIG. 1.

The effluent in line 114 from the chlorine dioxide generator 102 is passed to an anode compartment 119 which is separated from a cathode compartment 120 by a cation-exchange membrane 122. An electrolyte is fed to the cathode compartment 120 by line 123. Electric current is applied to the cell 116 by an anode 124 and a cathode 126.

An acidified sodium chlorate solution containing chloric acid in molar amount corresponding to the make up feed of sodium chlorate in line 118 is removed from the anode compartment 118 and recycled to the chlorine dioxide generating cell 102 by line 108. Sodium hydroxide solution is removed from the cathode compartment 120 and is recycled by line 128 through a gas-liquid separator 130 from which hydrogen is vented by line 132 until the desired concentration is achieved. The product sodium hydroxide solution is removed by line 134.

As in the case of the embodiment of FIG. 1, the chlorine dioxide generating process 100 produces chlorine dioxide from chloric acid at a high efficiency greater than about 90%, preferably greater than about 95%, without producing any by-product sodium sulfate requiring disposal.

EXAMPLES

Example 1

This Example, as well as the succeeding Examples 2 and 3, illustrates the production of chlorine dioxide by a purely chemical process.

A nominal 10L chlorine dioxide generator was operated at the boiling point of an aqueous acid reaction medium of 60° C. under a subatmospheric pressure of 128 mm Hg to produce chlorine dioxide at a relatively slow production rate of about 5 g/min.

An aqueous solution of 5.1 M sodium chlorate and 1.44 N chloric acid was fed to the reaction medium at a flow rate of approximately 50 mL/min while methanol was fed to the generator at a flow rate of approximately 4.6 mL/min. The reaction medium had a total acid normality of about 1.2 to 1.3 N (which usually includes about 0.3 to 0.4 N formic acid) and about 6 to 6.6 M $NaClO_3$.

The generator was operated under steady state conditions to precipitate sodium chlorate from the aqueous reaction medium, which was removed from the generator. The sodium chlorate removed from the crystal generator was formed into a saturated aqueous solution thereof and then electrolyzed to form the feed solution of aqueous sodium chlorate and chloric acid.

The electrolysis was carried out in a two-compartment MP cell, supplied by Electrocell AB, Sweden, equipped with an oxygen-evolving anode (DSA-$O_2$®), nickel cathode and a cation exchange membrane (NAFION ® 427) dividing the cell into an anode compartment and a cathode compartment. The anode, cathode and membrane each had an area of 100 sq. cm. A current density of about $3kA/cm^2$ and a temperature of about 40° to 50° C. were employed with the aqueous sodium chlorate as the anolyte and a 1 N aqueous sodium hydroxide solution as the catholyte.

This experiment produced an overall yield of chlorine dioxide of 98.7%, over the reaction period of 2.65 hours. (The yield of chlorine dioxide is the extent to which 1 mole of chlorate ion reacts to form 1 mole of chlorine dioxide). This experiment exhibited a methanol consumption of 0.34 g/$gClO_2$ produced, which is higher than the normal consumption of an R8 process (approximately 0.15 g/$gClO_2$).

Example 2

The procedure of Example 1 was repeated, with the exceptions that the aqueous reaction medium had a total acidity of about 1.3 to 1.8 normal and a sodium chlorate concentration about 5 to 5.6 M, the boiling temperature was 63° C. and the subatmospheric pressure was 150 mm Hg.

Over a 2.28 hour reaction time, the yield of chlorine dioxide was 98% at a more commercially-acceptable production rate of chlorine dioxide of 7 g $ClO_2$ per minute. An excess of methanol was supplied in order to ensure that acidity would be limiting the production rate rather than methanol.

Example 3

The procedure of Example 1 was repeated, with the exceptions that the aqueous solution medium had a total acidity of about 2 to 2.2 normal and a sodium chlorate concentration of about 5.8 to 6.2 molar, the boiling temperature was 65° C. and the subatmospheric pressure was 150 mm Hg.

Over a 1.5 hour reaction time, the yield of chlorine dioxide was 98% at a production rate of 12 to 20 g $ClO_2$/min. An excess of methanol was supplied in order to ensure that acidity would be limiting the production rate rather than methanol.

The results of the foregoing Examples 1 to 3 demonstrate the production of chlorine dioxide at high efficiency (yield) from a methanol-based chlorine dioxide generating process using chloric acid to provide both the chlorate ions and hydrogen ions for the process for a wide range of total acid normalities, under conditions in which sodium chlorate cycles as a deadload between generator and electrolyzer and no effluent by-product is formed.

Example 4

This Example illustrates the production of chlorine dioxide by an autocatalytic electrolytic process.

Electrolytic experiments were carried out in a modified, undivided MP cell from Electrocell AB, equipped with a three-dimensional cathode made of several layers of carbon cloth (SWB-8 from Stackpole). The total thickness of the 3-D electrode was approximately 20 mm and the cross-sectional surface area was approximately 100 $cm^2$. The cathodic current feeder was titanium and a DSA-$O_2$ ® electrode from Eltech was used as an anode.

The superficial current density was varied in the range of about 1 to about 3 kA/$M^2$ while the temperature was varied from about 25° to about 70° C. Chlorine dioxide was stripped from the cathode compartment to a potassium iodide (KI) trap by bubbling nitrogen and by applying a low level of vacuum.

Various aqueous mixtures of chloric acid and sodium chlorate, were fed to the electrolytic cell. The results of the experiments are summarized in the following Table I:

acidities close to 2 normal at elevated temperature and 2.5 normal at ambient temperatures.

Example 5

An additional experiment was carried out in the cell in Example 4, in which relatively-concentrated chloric acid (approximately 3.5 M) was blended with sulphuric acid for a total acid normality of 6.0 N. No additional chlorate in the form of sodium chlorate was added.

At a current density of 2 kA/$cm^2$, a very pure $ClO_2$ (97%) was produced with chemical and current efficiencies of 90% and 58% respectively, thereby demonstrating that an efficient generation of chlorine dioxide in an autocatalytic process can be achieved at acidities lower than about 7 normal, when the chlorate ion concentration is increased and sulfate ion decreased.

SUMMARY OF DISCLOSURE

In summary of this disclosure, the present invention provides a novel process for forming chlorine dioxide from chloric acid in an effluent-free process by employing a deadload of sodium or other alkali metal chlorate cycling between the chlorine dioxide generator and an acidifying cell. Modifications are possible within the scope of this invention.

What we claim is:

1. A continuous method for the production of chlorine dioxide, which comprises:

forming an aqueous acid reaction medium in a chlorine dioxide generation zone, effecting reduction of chloric acid to form chlorine dioxide in said aqueous acid reaction medium having a total acid normality of up to about 7 normal in the substantial absence of sulfate ions and in the presence of a sufficient dead load of sodium chlorate to permit said chlorine dioxide formation to be effected, removing said dead load sodium chlorate from said chlorine dioxide generation zone, forwarding said removed dead load sodium chlorate to an electrolysis zone in which a sodium chlorate feed solution, which includes said removed dead load sodium chlorate and added sodium chlorate to make up for chloric acid consumed in said reduction, is electrochemically acidified to produce an acidified solution while sodium ions are electrochemically removed from the said sodium chlorate feed solution, and forwarding said acidified solution containing chloric acid and said dead load sodium chlorate to said chlorine dioxide generation zone to provide a feed of chloric acid and dead load sodium chlorate to said aqueous acid reaction medium, whereby said

| Expt. No. | Temp. °C. | Initial chlorate conc. = [$NaClO_3$] + [$HClO_3$] [M] | Initial acidity = [$HClO_3$] [M] | Current density [kA/$m^2$] | Current efficiency % | Chem.* efficiency % | $ClO_2$ purity % |
|---|---|---|---|---|---|---|---|
| 1 | 25 | 6.0 | 2.4 | 1.0 | 40.2 | 80 | 93.8 |
| 2 | 55 | 6.9 | 2.06 | 1.0 | 55.5 | 88 | 91 |
| 3 | 55 | 6.9 | 2.00 | 1.0 | 53.0 | 87 | 92 |
| 4 | 60 | 7.0 | 1.68 | 1.0 | 42.2 | 81 | 90 |
| 5 | 60 | 7.3 | 1.94 | 2.0 | 47.5 | 84 | 90 |
| 6 | 70 | 7.3 | 1.97 | 3.0 | 51.9 | 86.6 | 90.4 |

*calculated based on current efficiency.

As may be seen from the above Table, good efficiencies of chlorine dioxide production were obtained at dead load of sodium chlorate is added to and subsequently removed from said aqueous acid reaction medium.

2. The method of claim 1 wherein said electrochemical acidification of said feed solution and electrochemical removal of alkali metal ions are effected simultaneously by:

provi ding an electrolytic cell comprising a cation-exchange membrane dividing said cell into an anode compartment and a cathode compartment, feeding said aqueous feed solution to said anode compartment, electrolytically producing hydrogen ions in said anode compartment while simultaneously effecting transfer of alkali metal cations from said anode compartment through said cation-exchange membrane to said cathode compartment, and removing said acidified feed solution from said anode compartment.

3. The method of claim 2 wherein said alkali metal chlorate is sodium chlorate.

4. The method of claim 3 wherein said feed solution to said anode compartment contains sufficient sodium ions to provide in said anode compartment a molar ratio of $[Na^+]:[H^+]$ of at least about 1000:1 to about 1:5 during said electrolytic production of hydrogen ions.

5. The method of claim 2 wherein said molar ratio of $[Na^+]:[H^-]$ is about 1000:1 to about 1:2.

6. The method of claim 2 wherein said anode compartment contains sufficient alkali metal ion to provide a current efficiency of at least about 70% during said electrolytic production of hydrogen ions.

7. The method of claim 6 wherein said current efficiency is at least about 80%.

8. The method of claim 2 wherein said anode compartment is provided with an additional separator between the anode and the feed stream.

9. The method of claim 3 wherein said electrolytic cell comprises one unit cell of a multiple number of unit cells each separated by bipolar membranes and having an anode and a cathode in terminal compartments located one at each end of the multiple member of unit cells, and said aqueous feed solution is fed in parallel streams to the acid compartment of each unit cell and said acidified solution is removed in parallel streams from the acid compartment of each unit cell.

10. The method of claim 9 wherein said aqueous feed solution is fed to a central compartment in each unit cell flanked by cation-exchange membranes and then to said acid compartment.

11. The method of claim 9 wherein hydroxyl ions are electrolytically produced in the base compartment of each unit cell simultaneously with the electrolytic production of hydrogen ions in the acid compartment of each unit cell, and an aqueous sodium hydroxide solution is removed from each base compartment of each unit cell.

12. The method of claim 2 wherein said electrolytic production of hydrogen ions is effected at a membrane current density of about 0.01 to about 10 kA/m$^2$.

13. The method of claim 12 wherein said current density is about 1 to 5 kA/m$^2$.

14. The method of claim 2 wherein said acidified alkali metal salt solution is recirculated through the anode compartment until the desired acidity is achieved.

15. The method of claim 2 wherein hydroxyl ions are electrolytically produced in said cathode compartment simultaneous with said electrolytic production of hydrogen ions in said anode compartment, and an alkali metal hydroxide solution is removed from said cathode compartment.

16. The method of claim 15 wherein said alkali metal is sodium.

17. The method of claim 16 wherein said sodium hydroxide solution is recirculated through the cathode compartment until the desired concentration of aqueous sodium hydroxide solution is produced.

18. The method of claim 1 wherein said electrochemical acidification of said aqueous solution of at least one alkali metal salt is effected by anodic hydrogen gas oxidation to hydrogen ions and addition of said hydrogen ions to said aqueous solution, and said electrochemical removal of alkali metal ions is effect by transfer of alkali metal ions from said aqueous solution across a cation-exchange ions to a recipient medium.

19. The method of claim 18 wherein cathodic electroreduction of oxygen gas is effected whereby said anodic and cathodic reactions constitute a fuel cell producing electrical energy.

20. The method of claim 18 wherein cathodic reduction of water is effected in said recipient medium to produce hydrogen and hydroxyl ions to combine with said transferred alkali metal ions to form an aqueous alkali metal hydroxide solution, and said hydrogen is fed to said anodic hydrogen gas oxidation.

21. The method of claim 1 wherein said electrochemical acidification of said aqueous solution of at least one alkali metal salt is effected by anodic oxidation of water in said aqueous solution to hydrogen ions and oxygen and said electrochemical removal of alkali metal ions is effected by transfer of alkali metal ions from said aqueous solution across a cation-exchange membrane to a recipient medium.

22. The method of claim 21 wherein cathodic electroreduction of said oxygen is effected.

23. The method of claim 1 wherein said reduction is effected using methanol.

24. A method for the production of chlorine dioxide, which comprises:

feeding chloric acid and an aqueous solution of sodium chlorate to an aqueous acid reaction medium in a reaction zone having a total acid normality of from about 0.1 to about 6 normal and a concentration of sodium chlorate of from about 6 to about 9 molar, maintaining said aqueous reaction medium at its boiling point at a temperature of at least about 50° C. up to the temperature of spontaneous decomposition of chlorine dioxide under a subatmospheric pressure of about 50 to about 400 mm Hg applied to the reaction zone, generating chlorine dioxide from said aqueous acid reaction medium by reduction of chlorate ions with methanol at said total acid normality of from about 0.1 to about 6 normal maintained by said feed of chloric acid and said concentration of sodium chlorate of from about 6 to about 9 molar maintained by said feed of aqueous solution of sodium chlorate, removing chlorine dioxide in admixture with steam from said reaction zone, and removing sodium chlorate from said reaction zone in a quantity corresponding to that fed to said reaction zone in said aqueous sodium chlorate solution, whereby said chlorine dioxide generation is effected in the presence of a dead load of sodium chlorate fed to and subsequently removed from said reaction zone.

25. The method of claim 24 wherein said reaction medium has a total acid normality of about 1 to about 3 normal.

26. The method of claim 25 wherein said reaction medium has a total acid normality of about 1.5 to about 2.5 normal.

27. The method co claim 23 wherein said reaction medium is substantially saturated with sodium chlorate, whereby sodium chlorate fed to said reaction medium is precipitated from said reaction medium in said reaction zone and said sodium chlorate removed from said reaction zone is removed in solid crystalline form.

28. The method of claim 24 wherein said sodium chlorate concentration is from about 7 to about 8 molar.

29. The method of claim 24 wherein said temperature is from about 60° to about 75° C.

30. The method of claim 24 wherein said reaction zone is maintained under a subatmospheric pressure of about 90 to about 150 mm Hg.

31. The method of claim 24 wherein said removed sodium chlorate is forwarded to an electrolysis zone in which a sodium chlorate feed solution, which includes said removed sodium chlorate and added sodium chlorate to make up for chloric acid consumed in said process, is electrochemically acidified to produce an acidified solution while sodium ions are electrochemically removed from said sodium chlorate feed solution, and the acidified solution is forwarded to said reaction zone to provide said feed of chloric acid and an aqueous sodium chlorate solution to said reaction zone.

32. The method of claim 31 wherein said removed sodium chlorate is in solid crystalline form and is formed into an aqueous solution thereof for forwarding to said electrolysis zone.

33. The method of claim 31 wherein said removed sodium chlorate is in aqueous solution with spent reaction medium and said aqueous solution is forwarded to said electrolysis zone.

34. An electrochemical process for the production of chlorine dioxide, which comprises:
  feeding chloric acid and an aqueous solution of sodium chlorate to an aqueous acid solution in an electrolytic zone having a total acid normality of less than about 7 and a concentration of sodium chlorate of at least about 2 molar,
  passing a cathodic electrical current through said aqueous acid solution of a magnitude sufficient to effect chlorine dioxide generation from said aqueous acid solution in said electrolysis zone, employing an electroconductive cathode which is chemically inert to the production of chlorine dioxide from said aqueous acid solution,
  maintaining said total acid normality of less than about 7 normal and said concentration of sodium chlorate of at least about 2 molar in said aqueous acid solution by said feeds of chloric acid and aqueous sodium chlorate solution respectively,
  removing chlorine dioxide from said electrolysis zone while maintaining a dissolved concentration of chlorine dioxide in said aqueous acid solution, and
  removing sodium chlorate from said electrolysis zone in a quantity corresponding to that fed to said electrolysis zone in said aqueous sodium chlorate solution, whereby said chlorine dioxide generation is effected int he presence of a dead load of sodium chlorate fed to and subsequently removed from said electrolysis zone.

35. The method of claim 34 wherein said aqueous acid solution of chloric acid a total acid normality of about 1.5 to about 3.5.

36. The process of claim 34 wherein said sodium chlorate is present in a concentration of about 5 to about 9 molar.

37. The process of claim 34 wherein said dissolved concentration of chlorine dioxide varies from about 0.01 to about 15 gpl.

38. The process of claim 37 wherein said dissolved concentration of chlorine dioxide varies from about 0.1 to about 8 gpl.

39. The process of claim 37 wherein the concentration of chlorate ion in said aqueous solution of chloric acid is in a molar excess to the dissolved concentration of chlorine dioxide of at least about 2:1.

40. The process of claim 37 wherein the concentration chlorate ion in said aqueous solution of chloric acid is in a molar excess to the dissolved concentration of chlorine dioxide of at least about 10:1.

41. The process of claim 39 wherein the concentration of dissolved chlorine dioxide is maintained at a substantially uniform level during production of chlorine dioxide.

42. The process of claim 36 wherein said removed sodium chlorate is forwarded to an electrolysis zone in which a sodium chlorate feed solution, which includes said removed sodium chlorate and added sodium chlorate to make up for chloric acid consumed in said process, is electrochemically acidified to provide an acidified solution while sodium ions are electrochemically removed from said sodium chlorate feed solution, and the acidified solution is forwarded to said electrolysis zone to provide said feed of chloric acid and an aqueous sodium chlorate to said electrolysis zone.

43. The process of claim 34 wherein said cathodic electric current has a potential of about +1.0 to about −0.5 Volts as compared with a saturated calomel electrode.

44. The process of claim 34 wherein said electrode material is carbon.

45. The process of claim 44 wherein said cathode is in a three-dimensional, high surface area form.

46. The process of claim 34 which is carried out in an undivided electrolytic cell.

* * * * *